US007818244B1

United States Patent
Dharan et al.

(10) Patent No.: US 7,818,244 B1
(45) Date of Patent: Oct. 19, 2010

(54) TREE ON PATHS METHOD AND SYSTEM FOR MODELING SECURITIES

(75) Inventors: Venkat G. Dharan, Germantown, MD (US); Marat V. Kramin, Washington, DC (US); Alexander L. Shulman, Great Falls, VA (US)

(73) Assignee: Fannie Mae, Washington, DC (US)

( * ) Notice: Subject to any disclaimer, the term of this patent is extended or adjusted under 35 U.S.C. 154(b) by 2391 days.

(21) Appl. No.: 10/324,100

(22) Filed: Dec. 20, 2002

(51) Int. Cl.
*G06Q 40/00* (2006.01)

(52) U.S. Cl. ...................................... 705/37; 705/36 R
(58) Field of Classification Search ................... 705/50, 705/35–38, 47, 8
See application file for complete search history.

(56) References Cited

U.S. PATENT DOCUMENTS

| 5,187,801 | A | * | 2/1993 | Zenios et al. ................. 712/22 |
| 6,021,397 | A | * | 2/2000 | Jones et al. ................ 705/36 R |
| 6,772,136 | B2 | * | 8/2004 | Kant et al. ..................... 706/50 |
| 2001/0042785 | A1 | * | 11/2001 | Walker et al. ................ 235/379 |
| 2004/0039622 | A1 | * | 2/2004 | Masiello et al. ................ 705/8 |
| 2004/0117302 | A1 | * | 6/2004 | Weichert et al. .............. 705/40 |

OTHER PUBLICATIONS

Finance; Research from P. Glasserman and co-authors reveals new findings on finance, Anonymous. Mergers & Acquisitions Business. Atlanta: Feb. 24, 2010. p. 229.*

* cited by examiner

*Primary Examiner*—Hani M. Kazimi
*Assistant Examiner*—Clement Graham
(74) *Attorney, Agent, or Firm*—Rader, Fishman & Grauer PLLC

(57) ABSTRACT

A system for implementing a tree on paths method for generating a recombining interest rate tree from previously generated paths. The inventive method is a tree on paths method whereby a tree is created from previously generated paths. The tree on paths method uses Monte Carlo simulations to generate paths and uses a recombining algorithm to obtain a computationally efficient tree from the generated paths.

11 Claims, 7 Drawing Sheets

Prices of the 1-year European call option on a 1-year coupon bond

| Coupon | Out of the money, C =3.60% | | At the money, C =4.60% | | In the money, C =5.60% | |
|---|---|---|---|---|---|---|
| Step size | TOPs,N=300 | HW Lattice | TOPs,N=300 | HW Lattice | TOPs,N=300 | HW Lattice |
| Semiannual | 10.74 | 10.82 | 39.00 | 34.24 | 103.36 | 104.23 |
| Quarterly | 9.67 | 8.13 | 38.67 | 36.89 | 103.13 | 101.21 |
| Monthly | 9.23 | 8.83 | 39.08 | 38.43 | 102.25 | 102.21 |
| Weekly | 8.99 | 8.92 | 39.08 | 38.93 | 102.16 | 102.21 |
| Analytical HW | 8.88 | | 39.05 | | 102.14 | |

Fig. 4

Prices of the 5-year European call option on a 5-year coupon bond

| Coupon | Out of the money, C = 5.45% | | At the money, C = 6.45% | | In the money, C = 7.45% | |
|---|---|---|---|---|---|---|
| Step size | TOPs,N=300 | HW Lattice | TOPs,N=300 | HW Lattice | TOPs,N=300 | HW Lattice |
| Semiannual | 130.30 | 124.43 | 262.82 | 261.94 | 460.75 | 464.09 |
| Quarterly | 127.95 | 129.34 | 260.54 | 261.01 | 458.08 | 456.35 |
| Monthly | 126.26 | 126.74 | 259.14 | 259.53 | 456.97 | 457.38 |
| Weekly | 125.94 | 125.54 | 258.42 | 258.24 | 456.27 | 456.26 |
| Analytical HW | 125.37 | | 257.99 | | 456.02 | |

Fig. 5

TREE ON PATHS METHOD AND SYSTEM FOR MODELING SECURITIES

FIELD OF THE INVENTION

The present invention relates to a system and method for valuing securities and more particularly to a computationally effective method for valuing different types of securities.

BACKGROUND OF THE INVENTION

Issuers of securities sell their debt securities to domestic and global capital markets. Debt security issuers generally create different types of debt securities that are with maturities across the yield curve. For example, debt security issuers may create both short-term debt securities with maturities of a year or less and long-term debt securities with maturities of over a year. Non-callable or "bullet" securities are attractive because of their liquidity, price transparency, and spread advantage relative to comparable U.S. Treasuries securities with similar maturity periods. Issuers of callable debt securities effectively buy a call option from investors and compensate those investors with additional yield above comparable bullet securities.

The three main structural characteristics of a callable debt security are the maturity date, the lockout period, and the type of call feature. The maturity date of a callable debt instrument is the latest possible date at which the security will be retired and the principal redeemed. The lockout period refers to the amount of time for which a callable security cannot be called. For example, with a 10 non-call 3-year ("10nc3") debt security, the security cannot be called for the first three years. The call feature refers to the type of call option embedded in a callable security.

American-style callable debt is a debt security that has a continuous call feature after an initial lockout period. The investor is compensated for this type of call feature by receiving a higher yield in exchange for providing the issuer with the flexibility to call the security at any time after the lockout period with the requisite amount of notice. European-style call feature enables the issuer to exercise the option to call the debt on a single day at the end of the initial lockout period. European-style callable securities provide the investor an opportunity to obtain a greater spread over a comparable bullet security while reducing the uncertainty of a continuous call option. The Bermudan-style callable debt security is callable only on coupon payment dates, for example, semiannual dates after the conclusion of the initial lockout period.

With the rapid development of the fixed income securities market and the introduction of more complicated contingent claims, it is important to provide a general framework for describing interest rate movements and valuing interest rate products. By fitting a model to available interest rate data, one can discover the dynamics of term structure and the relationship between interest rates and derivative prices. By modeling interest rate securities, a financial institution is also able to manage the risk of its portfolio by determining the likely range of future prices and value at risk, among other variables.

Currently, the common numerical methods employed in derivatives valuation include the Monte-Carlo simulation method, finite difference algorithms and lattice approaches. Monte-Carlo simulation can be used for term structure modeling and derivatives pricing and can be applied to a variety of market instruments, such as various kinds of European-style callable debt securities. The main advantage of Monte-Carlo simulation is that it can, without much additional effort, incorporate complex payoff functions of complicated path-dependent securities. The computational costs for Monte-Carlo simulation increase linearly with the number of underlying factors. Therefore, Monte-Carlo simulation is more effective in valuing multi-factor models.

However, since the standard error of an estimate is inversely proportional to the square root of the number of simulation runs, a large number of simulation runs using the Monte-Carlo simulation method are generally required in order to achieve a desired level of precision. Since one cannot predict whether early exercise of an option call is optimal when a particular asset price is reached at a particular instant, it was a commonly held view that Monte-Carlo simulation could not be used to handle early exercise decisions for American-style derivative securities. Therefore, a number of advance approaches based on the Monte-Carlo simulation technique have been proposed for the valuation of American-style derivative securities.

Specifically, the Heath, Jarrow, and Morton approach represents a natural generalization of all existing non-arbitrage models. This approach is based on the specific non-arbitrage conditions imposed on the evolution of the forward rates and provides a unique martingale measure, under which, in general, the term structure evolution is not Markovian. However, the high computational costs involved with Monte-Carlo simulation is still an issue with all proposed approaches. Therefore, it is still difficult to use Monte-Carlo simulation for pricing American-style and Bermudan-style instruments, especially for a multi-factor specification.

Since a replicating portfolio can be found for every financial instrument, one can use non-arbitrage argument to derive a partial differential equation that describes the value of the financial instrument through time. One of the most efficient methods for solving partial differential equations is finite difference algorithms, which apply a discretization of the differential operators in the underlying equation. The numerical schemes arising from the discretization procedure can be broadly specified as either implicit or explicit schemes.

The lattice approach model is the simulation of the continuous asset price by a discrete random walk model. This model is the most widely used approach for valuing a wide variety of derivatives models because of its ease of implementation. In general, the lattice approach is equivalent to the explicit finite difference algorithms; however, it bypasses the derivation of partial differential equations and seeks to model the stochastic process directly, making it simpler to implement. Finite difference algorithms and lattice approach techniques may be easily used to price American-style securities. However, when the volatility of forward rates is not Markovian, the lattice approach leads to non-recombining trees, which is computationally restrictive for most practical applications.

SUMMARY OF THE INVENTION

The present invention is a system for implementing a tree on paths method for generating a recombining interest rate tree from previously generated paths. The tree on paths method uses Monte Carlo simulations to generate paths and uses a recombining algorithm, such as a lattice approach, to obtain a computationally efficient tree from the generated paths. Therefore, the inventive tree on paths method is easier and more computationally efficient to implement than previous models and it may be applied to American-style, European-style and Bermudan-style securities, among others.

It is therefore an object of the tree on paths invention to create a method for approximating distribution of process state variables for interest rate modeling. The method includes steps for specifying a stochastic process for an underlying state variable and for using Monte-Carlo simulations to generate states representing future evolutions for a given time period through a desired maturity date. The inventive method then recombines states generated from the Monte-Carlo simulation into a tree. The generated tree may be used to represent an interest rate model by calculating probabilities to match the known conditional mean and variance of the stochastic process at each state.

Another embodiment of the invention provides a computer system having a plurality of components for approximating distribution of a stochastic process for modeling derivative securities. The computer system includes means for specifying a stochastic process for underlying state variables; means for using Monte Carlo simulations to generate states that represent future evolutions for a given time period through a given maturity date for the security; means for structuring the generated states to facilitate in searching for current states that needs to be linked to previous states; means for generating a computationally efficient tree by linking an initial state to generated states and by recombining, for all subsequent time periods, each generated state at a current time with states generated for a subsequent time by generating a plurality of states at the current time by using a current state, whereby the plurality of states are used to identify the closest actual states available at the subsequent time and the plurality of states are linked to the current state at the current time; and means for using the computationally efficient tree to evaluate the derivative security.

Another embodiment of the invention provides a computer-readable medium whose contents cause a computer system to approximate distribution of a stochastic process for modeling derivative securities, the computer system having a plurality of components with functions for approximating distribution of the stochastic process by performing the steps of specifying a stochastic process for an underlying state variable; using Monte Carlo simulations to generate states that represent future evolutions for a given time period through a given maturity date for the security; structuring the generated states to facilitate in searching for current states that needs to be linked to previous states; generating a computationally efficient tree by linking an initial state to generated states and by recombining, for all subsequent time periods, each generated state at a current time with states generated for a subsequent time by generating a plurality of states at the current time by using a current state, whereby the plurality of states are used to identify the closest actual states available at the subsequent time and the plurality of states are linked to the current state at the current time; and using the computationally efficient tree to evaluate the derivative security.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 4 illustrates comparisons between the tree on paths method and a HW Lattice method for a European call option with a one year maturity on a one year coupon bond;

FIG. 5 illustrates comparisons between the tree on paths method and the HW Lattice method for a European call option with a five year maturity on a five year coupon bond;

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for determining the value of derivative securities.

Figure 1:
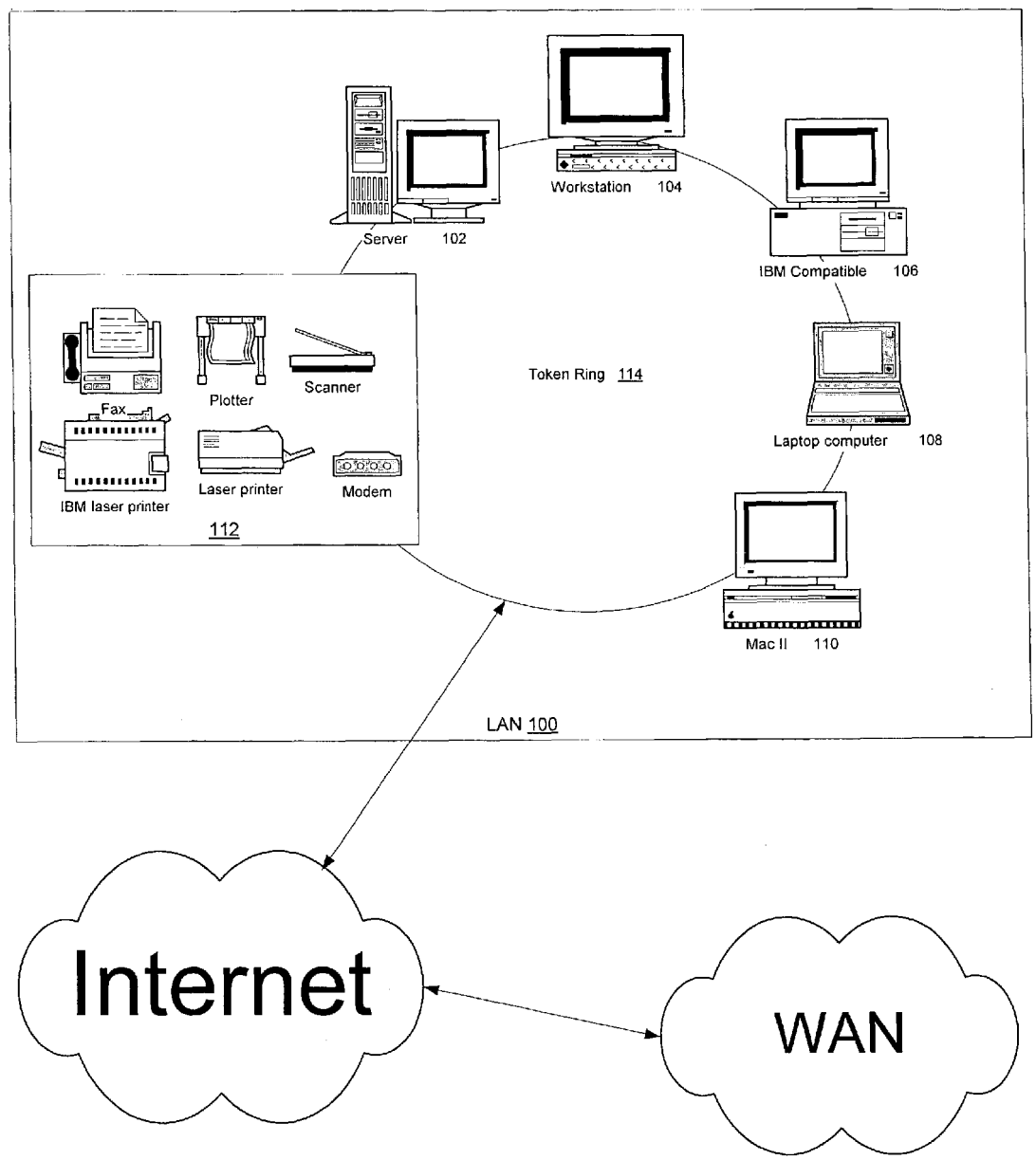
FIG. 1 illustrates a local area network that is configured to determine the value of derivative securities.

FIG. 1 is an example of a local area network (LAN) 100 that is configured to determine the value of derivative securities. LAN 100 comprises a server 102, four computer systems 104-110, and peripherals, such as printers and other devices 112, that may be shared by components on LAN 100. Computer system 104-110 may serve as clients for server 102 and/or as clients and/or servers for each other and/or for other components connected to LAN 100. Components on LAN 100 are preferably connected together by cable media, for example copper or fiber-optic cable and the network typology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

LAN 100 also may be connected to other computer networks, such as the Internet, other LANs or Wide Area Networks (WAN). However, it should also be obvious to one skilled in the art that the invention may be practiced on a single processor that is not part of a computer network. The computer processor for executing the inventive system and method, for example server 102 and/or computer systems 104-110, include electronic storage media, such as disks, for storing programming code and data structures used to implement the inventive method and outputs from therefrom.

The present invention is an alternative method of constructing a simple interest rate tree for valuing interest rate derivatives in the Heath, Jarrow and Morton framework where it is difficult to build a recombining interest rate tree. The invention uses a computer system, for example computer system 104, to implement an inventive tree on paths method, whereby a tree is created from previously generated paths. Note that any computer system may be configured to implement the inventive method and computer system 104 is only used for exemplary purpose.

The tree on paths method may be applied to areas, such as equity and currency markets, where a binomial or multinomial tree is built to value American-style options. As is known to others skilled in the art, the tree on paths method also may be used to value any derivative securities including interest rate derivative, equity derivative, and currency derivative. In a preferred embodiment, the tree on paths method electronically implements Monte Carlo simulations on computer system 104 to generate paths and uses a recombining algorithm, such as a lattice approach, to obtain a computationally efficient tree from the generated paths. The inventive tree on paths method is easier to implement than previous models and it may be applied to American-style, European-style and Bermudan-style securities, among others.

The tree on paths invention electronically builds a tree for a general stochastic process by using Monte-Carlo simulations to generate paths. The generated paths represent future evolutions of a given process for a given time period through a desired maturity date. Monte Carlo simulations enables an even sampling from the distribution underlying the stochastic process at any time horizon. The states generated using Monte Carlo simulations at some time t+Δt can be recombined with states generated for the previous time, t. In a preferred embodiment of the invention, the tree on paths method implements the lattice approach to recombine states generated from the Monte-Carlo simulation into a tree and uses the tree to electronically evaluate the means and variance of an underlying stochastic process.

Figure 2:
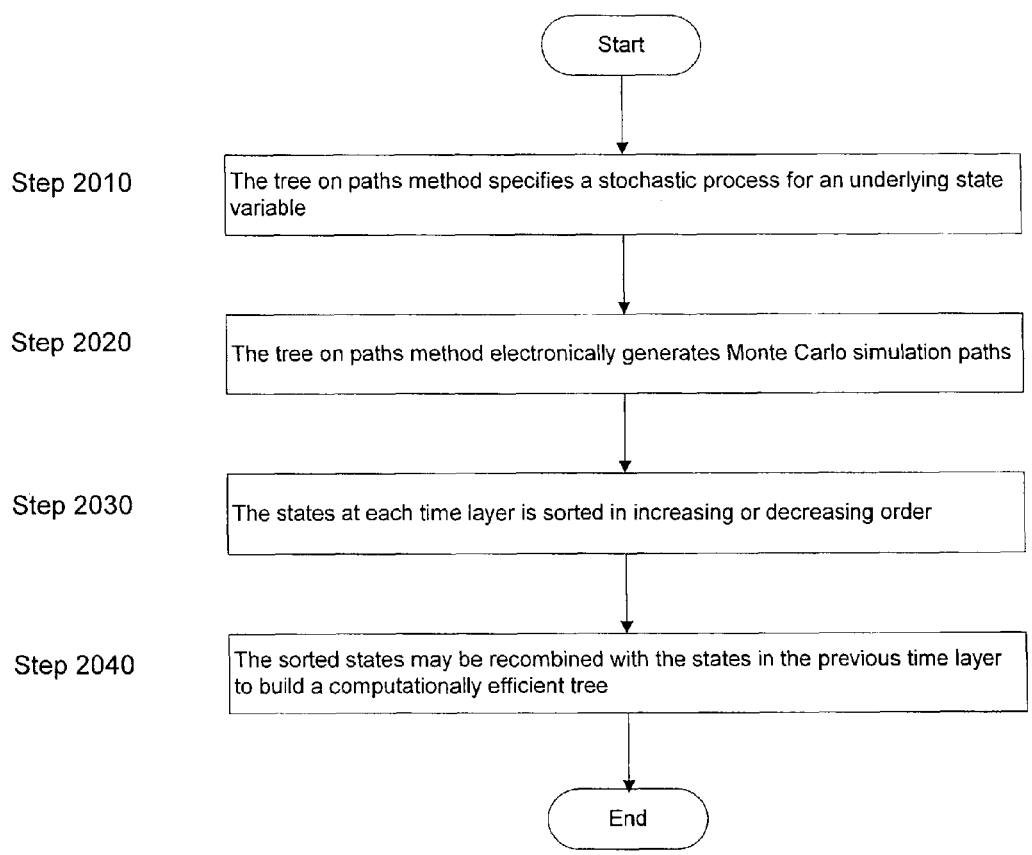
FIG. 2 illustrates the steps implemented in the inventive tree on paths method.

FIG. 2 illustrates the steps implemented in the inventive tree on paths method. In Step 2010, the tree on paths method specifies a stochastic process for underlying state variables. In Step 2020, the inventive method electronically generates N Monte Carlo simulation paths by using the following Euler difference equation.

$$r(t+\Delta t) = r(t) + \mu(r(t), \phi(t), t)\Delta t + \sigma(r(t), t)\sqrt{\Delta t}\epsilon,$$

$$\phi(t+\Delta t) = \phi(t) + [\sigma(r(t), t)^2 - 2\kappa\phi(t)]\Delta t, \phi(0) = 0,$$

where r is the instantaneous interest rate at time t, $\kappa$ is a constant mean-reversion parameter, $\epsilon$ represents a standard normal variate, and $$\mu(r(t), \phi(t), t) = \kappa(f(0, t, t+\Delta t) - r(t)) + \phi(t) + \frac{f(0, t+\Delta t, t+2\Delta t) - f(0, t, t+\Delta t)}{\Delta t}, \sigma(r(t), t) = \sigma r(t)^\gamma$$

where f(0,t) is the initial forward rate curve, $f_t(0,t)$ is its partial derivative with respect to t, and $\sigma$ is a constant volatility coefficient. The second state variable, $\phi(t)$, represents the accumulation of past information and follows the evolution given in the Equation 2.

In Step 2030, after paths are generated with the Monte-Carlo simulations, the states at each time layer is sorted in increasing or decreasing order. Even though an ordering is generally not essential to the tree construction, it speeds up the task of constructing an efficient tree by facilitating in a search for a state that needs to be linked to an initial state. For a single state variable model, the ordering is a trivial task. For a two state variable model, the states can be ordered first by the primary state variable r and then by the secondary variable $\phi$. In Step 2040, after the states are sorted, they may be recombined with the states in the previous time layer to build a tree. According to the invention, the tree construction is complete when the step for recombining a state with another state in a previous time layer is repeated for all the states generated from the Monte Carlo simulation.

Figure 3:
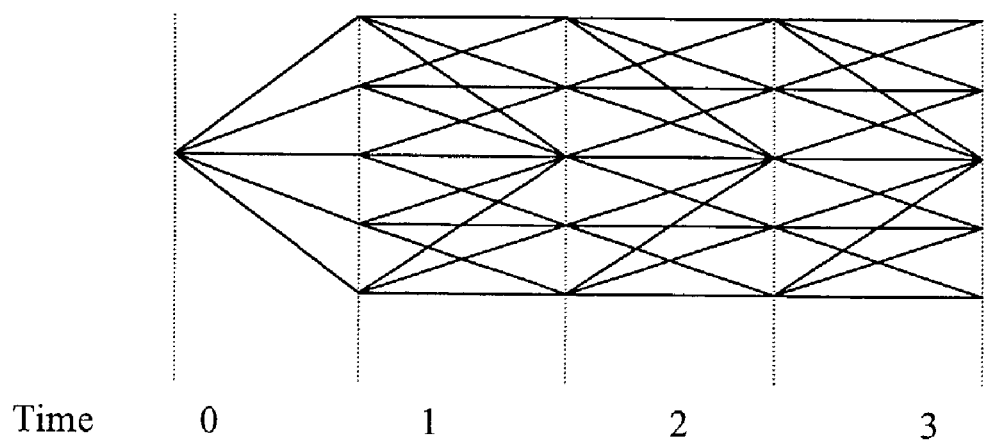
FIG. 3 illustrates the geometry of the inventive computationally-efficient tree.

For example, assume that there are only 5 paths generated from the Monte-Carlo simulation, such that N=5 and the time steps are spaced one year apart. FIG. 3 illustrates the geometry of the inventive computationally-efficient tree. In FIG. 3, for the first step from time 0 to 1, the tree on paths method links the initial state to the 5 states in the next time slice, with the probability of movement set equally for all links to ⅕, i.e. 0.2. For all subsequent time steps, the tree on paths method recombines the states between two layers as follows. Given a state, $s(r(t), \phi(t))$, at time t, the inventive method generates three states at t+Δt, $s_u^*, s_m^*, s_d^*$, using the following equation:

$$r^*(t+\Delta t) = r(t) + \mu(s,t)\Delta t + J \cdot \sigma(r(t),t)\sqrt{c\Delta t}, J = -1, 0, 1.$$

$$\phi^*(t+\Delta t) = \phi(t) + [\phi(r(t),t)^2 - 2\kappa\phi(t)]\Delta t, \phi(0) = 0.$$

The three states generated by the above equation are used to identify the closest actual states available at time t+Δt. The states identified in this manner are denoted $s_u, s_m, s_d$. The next step is to link these states to the initial state s at time t with the transition probabilities given by:

$$p^u = \frac{\sigma^2 \Delta t + \mu^2 \Delta t^2 - \mu \Delta t \cdot (\Delta_d + \Delta_m) + \Delta_d \cdot \Delta_m}{(\Delta_u - \Delta_m)(\Delta_u - \Delta_d)}, \overrightarrow{u, m, d}$$

where $\Delta_u = r_u - r, \overrightarrow{u,m,d}$. In the equation above, the dependence of $\mu$ and $\sigma$ on the state, s, is suppressed for notational simplicity. Also note that the probabilities are calculated explicitly using the primary state variable, r. However, the secondary state variable, $\phi$, implicitly enters the equation through its presence in the drift term. The tree construction is complete when the step for recombining a state with another state in a previous time layer is repeated for all the states generated from the Monte Carlo simulation.

The inventive tree on paths method is compared to a previously defined variation of the Heath, Jarrow and Morton method to illustrate the computational advantage of the tree on paths method. The tree on paths method is compared with a popular trinomial tree implementation, hereinafter the HW Lattice, described in a paper titled. "Numerical Procedures for Implementing Term Structure Models I: Single Factor Models." *Journal of Derivatives*, 2(1994) and published by Hull and White. The comparison occurs between prices of European options on coupon bonds. The initial term structure used for the comparison is given by the following discount function:

$$P(0,t)=e^{-R(0,t)\cdot t},$$

$$R(0,t)=a+b\cdot e^{c\cdot t},$$

where R(0,t) is the zero rate for t-year maturity, and a, b and c are some parameters. The LIBOR/Swap yield curve prevailing on Aug. 30, 2001 was used to fit the functional form in the above equation. The parameter values that gave a reasonably good fit are a=0.061323, b=−0.02865, and c=−0.18336.

The HW Lattice method is a simple case of the general model in the equation below, with γ=0.

$$dr(t)=[\kappa(f(0,t)-r(t))+\phi(t)+f_t(0,t)]dt+\sigma r(t)^\gamma dW(t),$$

$$d\phi(t)=[\sigma^2 r(t)^{2\gamma}-2\kappa\phi(t)]dt, \phi(0)=0$$

In this case, the equations above does not have any state dependence in the volatility term and are no longer path-dependent in the secondary state variable, φ. The parameter values assumed are the following: κ=0.05, σ=0.16, γ=0. The resulting interest rate distribution is normal and, therefore, analytically tractable for the prices of European options on coupon bonds. These analytically tractable prices can be used to benchmark the results obtained from the numerical implementations of the tree on tops method and the HW Lattice method.

FIGS. 4 and 5 illustrate comparisons between the tree on paths method and the HW Lattice method. The comparisons in FIG. 4 are conducted for a European call option with 1-year maturity on a 1-year coupon bond (1×1). The comparisons in FIG. 5 are conducted for a European call option with 5-year maturity on a 5-year coupon bond (5×5). The face value of the bonds in FIGS. 4 and 5 is 10,000 with semi-annual coupon C, the option strike is at par and the step sizes in the tree are semiannual (0.5), quarterly (0.25), monthly (1/12), and weekly (1/48). The number of Monte Carlo paths used in the inventive tree on paths method is 300, whereby N=300, and the securities are evaluated over different coupons, specifically, at-the-money (ATM), in-the-money (ATM+100 basis points), and out-of-the-money (ATM-100 basis points. The two security structures and the range of coupons provide a reasonable test of the numerical approximations to the continuous-time interest rate distribution.

Figure 6:
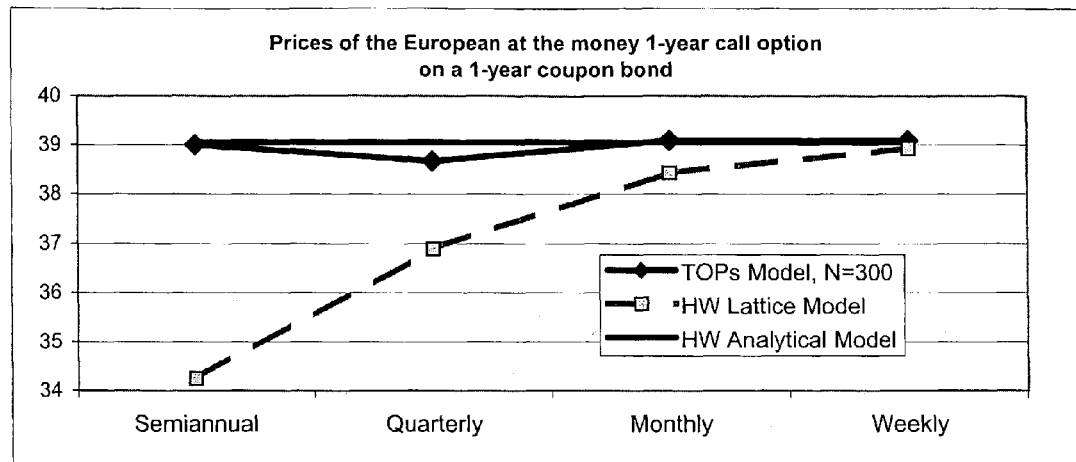
FIG. 6 illustrates comparisons between the tree on paths method and the HW Lattice method for a European call option with a one year maturity on a one year coupon bond with an at-the-money coupon of 4.60%.
Figure 7:
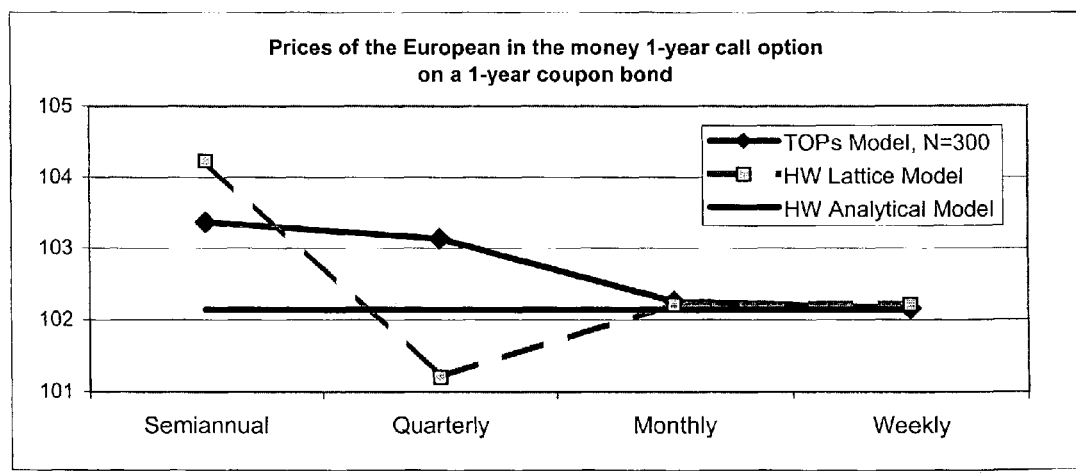
FIG. 7 illustrates comparisons between the tree on paths method and the HW Lattice method for a European call option with a one year maturity on a one year coupon bond with an in-the-money coupon of 5.60%.
Figure 8:
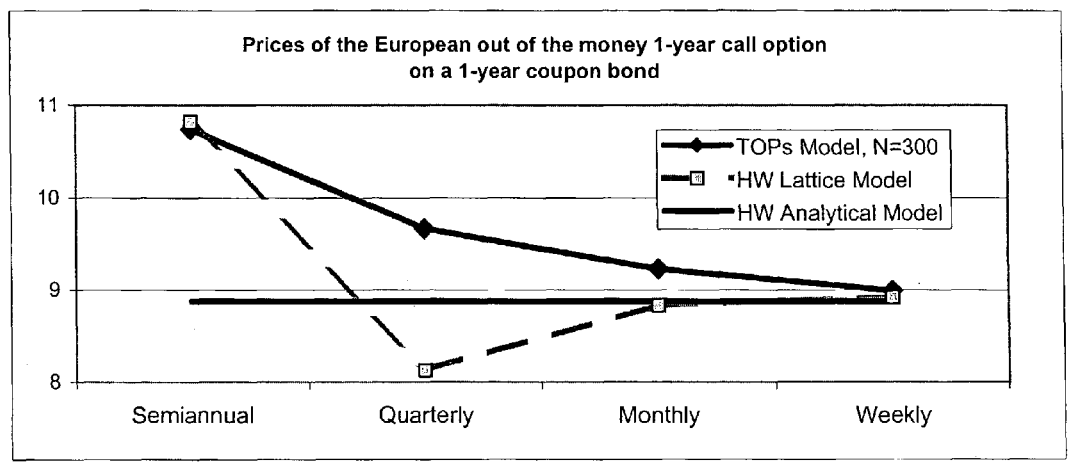
FIG. 8 illustrates comparisons between the tree on paths method and the HW Lattice method for a European call option with a one year maturity on a one year coupon bond with an out-of-the-money coupon of 3.60%.
Figure 9:
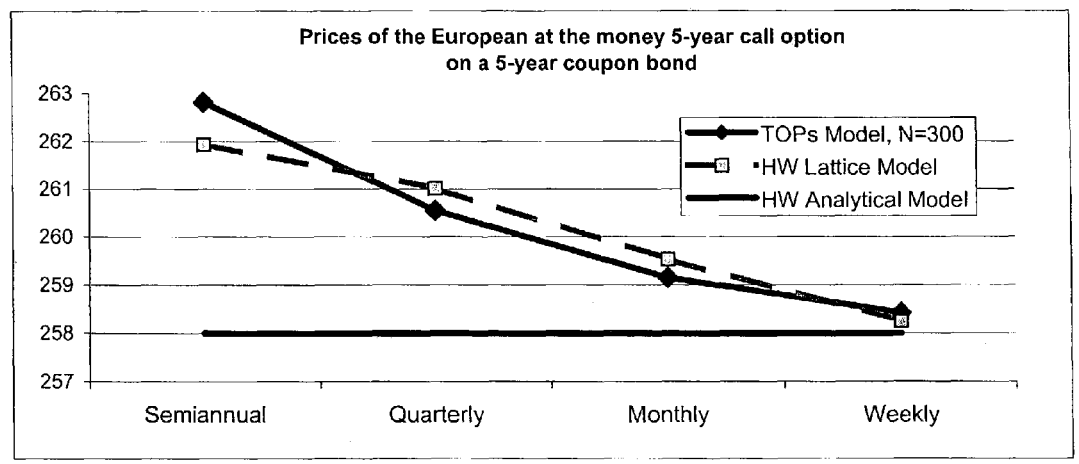
FIG. 9 illustrates comparisons between the tree on paths method and the HW Lattice method for a European call option with a five year maturity on a five year coupon bond with at-of-the-money coupon of 6.45%.
Figure 10:
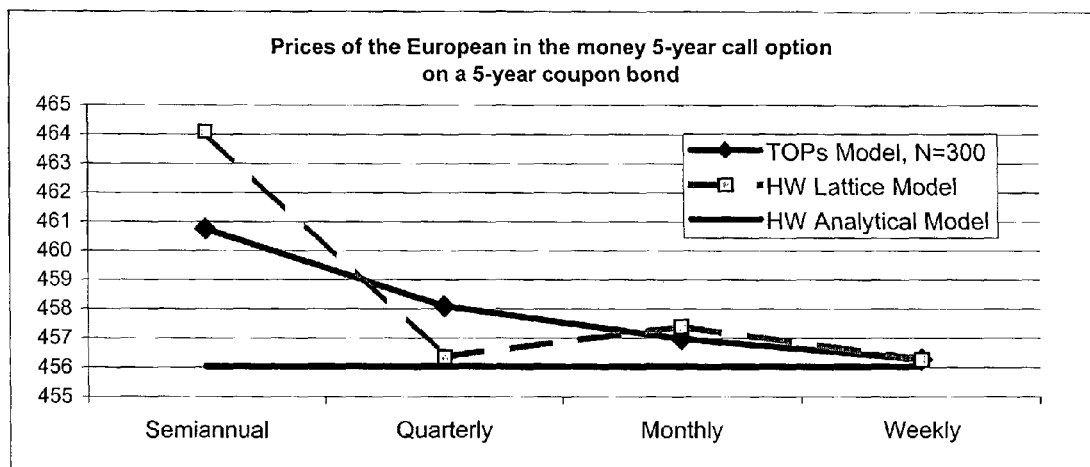
FIG. 10 illustrates comparisons between the tree on paths method and the HW Lattice method for a European call'option with a five year maturity on a five year coupon bond with in-of-the-money coupon of 7.45%.
Figure 11:
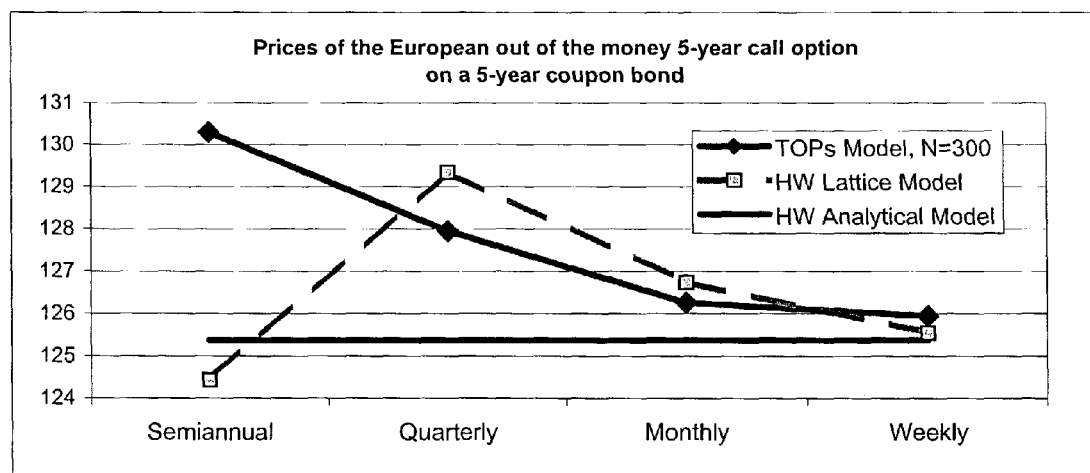
FIG. 11 illustrates comparisons between the tree on paths method and the HW Lattice method for a European call option with a five year maturity on a five year coupon bond with out-of-the-money coupon of 5.45%.

FIGS. 6-11 illustrate a pictorial representation of the results in FIGS. 4 and 5. FIG. 6 illustrates comparisons between the inventive tree on paths method and the HW Lattice method for a European call option with a one year maturity on a one year coupon bond with an at-the-money coupon of 4.60%. FIG. 7 illustrates comparisons between the tree on paths method and the HW Lattice method for a European call option with a one year maturity on a one year coupon bond with an in-the-money coupon of 5.60%. FIG. 8 illustrates comparisons between the tree on paths method and the HW Lattice method for a European call option with a one year maturity on a one year coupon bond with an out-of-the-money coupon of 3.60%. FIG. 9 illustrates comparisons between the tree on paths method and the HW Lattice method for a European call option with a five year maturity on a five year coupon bond with at-of-the-money coupon of 6.45%. FIG. 10 illustrates comparisons between the tree on paths method and the HW Lattice method for a European call option with a five year maturity on a five year coupon bond with in-of-the-money coupon of 7.45%. FIG. 11 illustrates comparisons between the tree on paths method and the HW Lattice method for a European call option with a five year maturity on a five year coupon bond with an out-of-the-money coupon of 5.45%.

FIGS. 6-11 make it evident that the pattern of convergence for the inventive tree on paths implementation is smoother than that for HW Lattice implementation in all cases. Both implementations are within a 1 basis point range of the analytical prices with weekly steps. Therefore, this comparison establishes the inventive tree on paths method as a viable alternative to the HW Lattice method. As shown in the above comparisons, the tree on paths method has a large number of states at the first time step and, therefore, provides a better representation of the distribution for short maturity options, the convergence of prices to the analytically tractable solution is smooth and robust across different specifications of the tree on paths method and with a parsimonious specification, the tree on paths method provides good precision for pricing options along with significant reduction in computational costs.

Even though the inventive tree on paths method is described in the context of a single-factor Heath, Jarrow, Morton model, it can be extended to a multi-factor model. The method can also be applied to the valuation of American-style options in other areas such as equity and currency markets.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A electronic programmed computer implemented method for approximating distribution of a Stochastic process for modeling derivative securities, the method comprising the steps of:
    specifying a stochastic process for an underlying state variable;
    using Monte Carlo simulations, by a computer, to generate a plurality of paths corresponding to the underlying state variable, each of the plurality of paths comprising states that represent future evolutions of the underlying state variable for a given time period through a given maturity date;
    generating a tree using a computer, based upon the plurality of paths, the tree comprising a recombining of states of the plurality of paths at each of a plurality of time layers, wherein the recombining for a given time layer determines a set of closest generated states for the given time layer as compared to a previous time layer, and applies a transition probability to link the set of closest generated states for the given time layer to a previous state; and
    wherein the underlying state variable is a primary state variable having a corresponding secondary state variable, and wherein specifying the stochastic process, using the Monte Carlo simulations, and generating the tree implement the primary state variable and the secondary state variable and using the generated tree to evaluate derivative securities.

2. The method of claim 1 wherein the Monte Carlo simulations use a Euler difference equation.

3. The method of claim 1, further comprising the step of structuring the states in the plurality of paths prior to generating the tree.

4. The method of claim 3, wherein structuring the states comprises sorting the states in increasing order to assist the recombining.

5. The method of claim 3, wherein structuring the states comprises sorting the states in decreasing order to assist the recombining.

6. The method of claim 1, wherein the tree is used to value different types of derivative securities.

7. The method of claim 1, wherein the underlying state variable is an interest rate.

8. The method of claim 1, wherein the underlying state variable is used to determine an interest rate.

9. A non transitory computer-readable medium having program code stored therein for approximating distribution of a stochastic process in modeling derivative securities, the program code including instructions which, when executed by a computer, perform operations comprising:

specifying a stochastic process for an underlying state variable;

using Monte Carlo simulations, by a computer, to generate a plurality of paths corresponding to the underlying state variable, each of the plurality of paths comprising states that represent future evolutions of the underlying state variable for a given time period;

generating a tree, using a computer, based upon the plurality of paths, the tree comprising a recombining of states of the plurality of paths at each of a plurality of time layers, wherein the recombining for a given time layer determines a set of closest generated states for the given time layer as compared to a previous time layer, and applies a transition probability to link the set of closest generated states for the given time layer to a previous state; and wherein the underlying state variable is a primary state variable having a corresponding secondary state variable, and wherein specifying the stochastic process, generating the Monte Carlo simulations, and generating the tree implement the primary state variable and the secondary state variable and using the tree to evaluate the derivative security.

10. The non transitory computer readable medium of claim 9, the underlying state variable is used to determine an interest rate.

11. The non transitory computer readable medium of claim 9, the underlying state variable is used to determine an interest rate.

* * * * *